United States Patent [19]
Cunningham et al.

[11] Patent Number: 5,941,294
[45] Date of Patent: Aug. 24, 1999

[54] RIM HOLDING TIRE CHANGERS MOUNT/ DISMOUNT HEAD CONNECT STRUCTURE

[75] Inventors: Charles L. Cunningham; David M. Carpenter, both of Nashville, Tenn.

[73] Assignee: Hennessy Industries, Inc., LaVergne, Tenn.

[21] Appl. No.: 09/026,239

[22] Filed: Feb. 19, 1998

[51] Int. Cl.[6] .................................................. B60C 25/135
[52] U.S. Cl. ............................................ 157/1.24; 157/1.2
[58] Field of Search ............................... 157/1.24, 1, 1.2, 157/1.22

[56] References Cited

U.S. PATENT DOCUMENTS

| | | | |
|---|---|---|---|
| 4,765,387 | 8/1988 | Mannen | 157/1 |
| 4,896,712 | 1/1990 | Du Quesne | 157/1.24 |

*Primary Examiner*—Timothy V. Eley
*Assistant Examiner*—Sinclair Skinner
*Attorney, Agent, or Firm*—Waddey & Patterson, P.C.; I. C. Waddey, Jr.

[57] ABSTRACT

A quick change assembly for connecting a mount/dismount head to a swing arm of a rim holding tire changer. The rim holding tire changer includes a swing arm mounted for swinging the mount/dismount head into and out of engagement with a tire on the table of the rim holding tire changer. The quick change assembly is connected to the end of the swing arm. The quick change assembly acts to connect the mount/dismount head to the end of the swing arm in a pre-aligned rotatable orientation. One end of the connector is adapted to mate with the mount/dismount head. That end includes an adjuster for adjusting the aligned relation of the mount/dismount head with respect to the connector end. The other end of the connector includes a locator for locating the pre-aligned rotatable orientation with respect to the swing arm end. Such locator may be a dowel inset in the swing arm end and a slot in the end of the connector which mates to the swing arm. A bore-counter-bore would be sufficient as well. The quick change assembly also includes a connector for preventing vertical displacement between the assembly and the mount/dismount head, thus forming a tool head. An attachment for quickly detaching and reattaching the assembly, and hence, the tool head, to the swing arm is also included in the connector assembly. A typical tool head for an automotive rim is disclosed, as is a typical plastic tool head for use with decorative rims, and a typical tool head for use with an RTV or motorcycle rim.

20 Claims, 5 Drawing Sheets

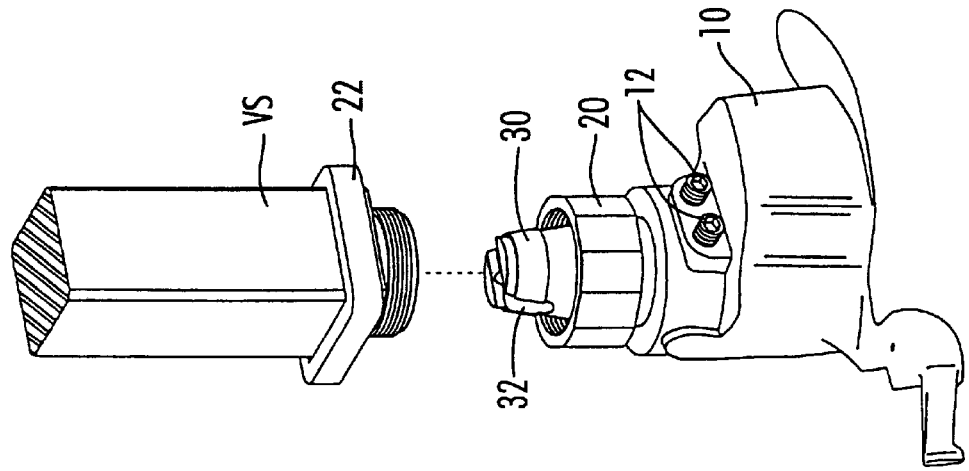
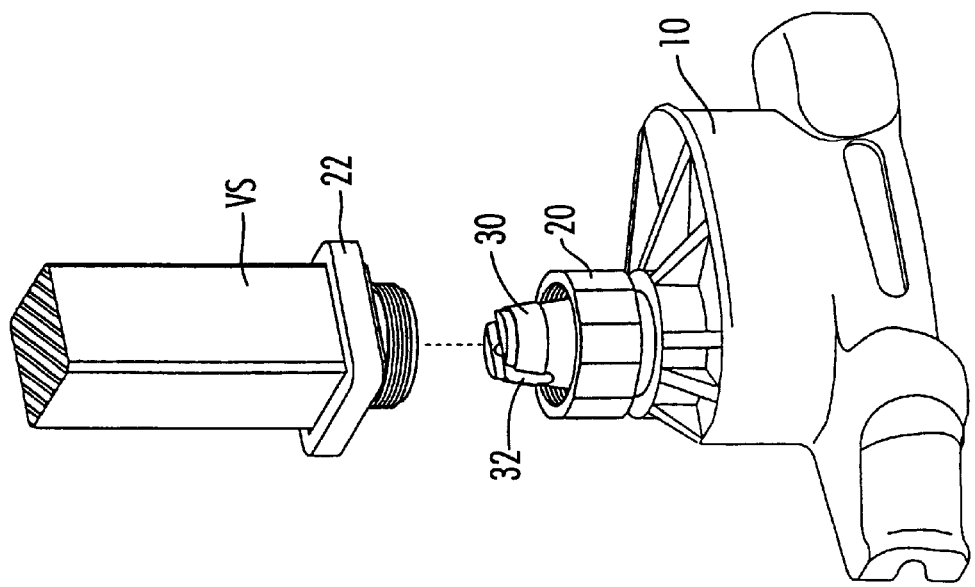
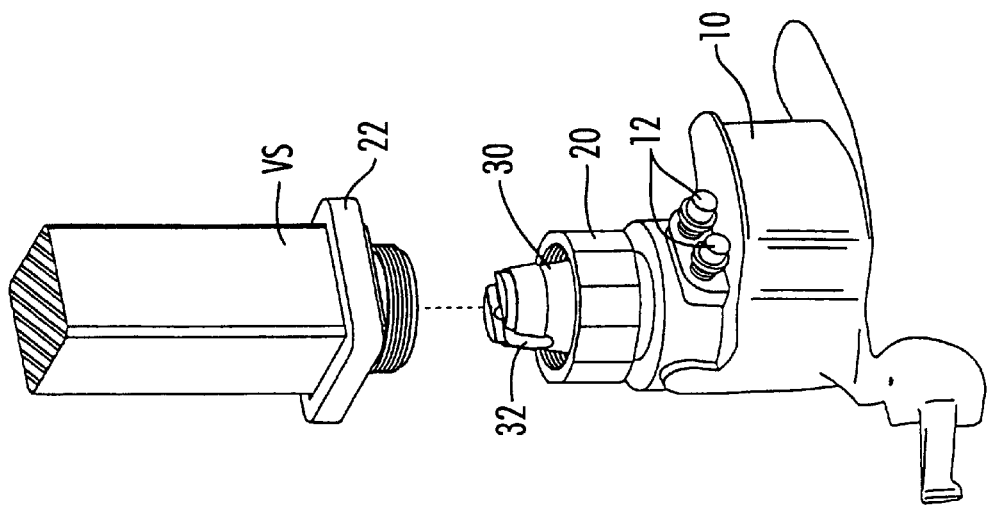

RIM HOLDING TIRE CHANGERS MOUNT/DISMOUNT HEAD CONNECT STRUCTURE

BACKGROUND OF THE INVENTION

The present invention relates generally to rim-holding tire changers, and more particularly to a quick-change assembly that can be connected to the mount/dismount head so that different dismount heads can be quickly substituted, one for the other with the proper angle and orientation of the mount/dismount head prefixed to mate with the rim for which the mount/dismount head is designed.

On rim-holding type tire changers, the contoured tool head is the device that allows the tire to be removed from or installed on the rim without damaging the bead rubber of the tire. The contoured tool head is sometimes referred to as the mount/dismount head. The mount/dismount head is normally connected to the lower end of a bar that is attached to a swing-arm. The swing-arm rotates about a pivot point and allows the mount/dismount head to be brought into engagement with the rim or be removed from engagement from the rim. The bar is mounted on the swing-arm for movement vertically so that the alignment of the head with the rim can be easily achieved.

One rim-holding tire changer can be used to mount or dismount the tires for a variety of types of vehicles. It is not uncommon for such a changer to be used to mount and dismount the tires on the rims of automobiles, pick-up trucks, motorcycles, and the like. Further, with some automobile rims, the rims are quite decorative, made of polished chrome and the like and thus require a special mount/dismount head in order to avoid marring the surface of the rim.

There are several basic designs for supporting the mount/dismount head; some machines have a tower with horizontal and vertical sides. These machines assure that the head is always tangent and perpendicular to the center line of the rim. However, these types of machines are unpopular because of manufacturing costs and because the tool head is normally at a very awkward location, usually the twelve o'clock position relative to the operator.

The more popular type of tire changer design is the "swing-arm" style of machine. Manufacturing costs of such machines is usually less; further, the mount/dismount head is positioned at the three o'clock or four o'clock position relative to the operator, which is much easier for the operator to handle. Unfortunately, in the swing-arm style machine, the mount/dismount head does not track exactly a tangent line perpendicular to the rim center line on all rims, because of the wide variety of rim diameters that must be serviced. Usually six-inch to twelve-inch rims require one setting, rims of twelve inches to eighteen inches require another setting, and rims eighteen to twenty-two inches require yet another setting. Because the setting angle of the mount/dismount head must be changed depending upon the size of the rim that a tire is being mounted on, the speed of the operator in a high-volume operation is substantially reduced because the operator must reset the angle with each new size rim and changing the angle of the head is time-consuming. Further, when the operator needs to change from a regular metal mount/dismount head to a plastic mount/dismount head in order to prevent scratching of decorative rims, setting the angle of the mount/dismount head is time-consuming.

It would be appreciated by those skilled in the art of designing and manufacturing equipment used to change the tubeless tires mounted on the rims of cars, light trucks and other vehicles, that such equipment must perform quickly and efficiently in order to be competitive in the marketplace. Modest improvements in the industry can thus become significant.

The type of equipment for which Applicant's invention is designed is the swing-arm rim-holding tire changer. Examples of such equipment include the tire changers manufactured by Hennessy Industries, Inc., Applicant's Assignee and marketed under the trademarks COATS™ and AMMCO™, including the COATS™ Model 5030A, Model 5060A-E and Model 5060AX-EX. However, there are many manufacturers of such equipment, including FMC Corporation of Chicago, Ill.; Corghi of Correggio, Italy, and SICE of Correggio, Italy. Equipment of this type has been readily available and on the market for many years, is the subject matter of numerous patents and has been described in a variety of publications, bulletins and brochures, operating instructional manuals, and the like. One such machine is illustrated in the design patent issued to Applicant as coinventor in U.S. Design Pat. No. 293,916.

In the normal tire-changing procedure, the operator places a rim on the table of the rim-holding tire changer, secures the rim to the table, places a tire over the rim, mounts the tire on the rim by using the mount/dismount head to force the bead over the rim, and then fills the air chamber of the tire with air to inflate the tire. This procedure is described in detail in U.S. patent application Ser. No. 08/516,129, the substance of which is incorporated here and by reference, and which is assigned to the Assignee of the present invention.

A problem that exists with the prior devices is the fact that when a different size rim is placed on the table, the angle of the mount/dismount head to the perimeter of the rim will not be properly oriented. The present invention provides a simple, inexpensive modification to obviate the problems of the prior art.

SUMMARY OF THE INVENTION

The present invention relates generally to rim holding tire changers, and more particularly to a quick-change assembly that can be connected to the mount/dismount head to allow different mount/dismount heads to be quickly substituted, one for the other without performing alignment procedures. There is a proper angle and rotational orientation for the mount/dismount head to operate effectively. The head should track a line tangent to a rim of a rim-type for which the mount/dismount was designed. This invention allows quick reattachment in the proper alignment after an initial rotational adjustment.

Rim holding tire changers include a table on which a tire to be changed is positioned, clamps for holding a rim of a tire placed onto the table, and a swing arm mounted for swinging the mount/dismount head into and out of engagement with a tire on the table. The swing arm has an end to which the mount/dismount head, sometimes referred to as a contoured tool head, is to be connected; thus, allowing the tire to be removed or installed on the rim without damaging the bead of the tire. Since one rim holding tire changer can be used to mount/dismount a variety of tires and rims it would be useful to have an invention for quickly changing the mount/dismount head and reattaching it in the proper orientation.

One embodiment of the present invention is a quick change connector for attaching the mount/dismount head to the end of the swing arm. The connector has a first end shaped to mate with and connect to the mount/dismount head in an adjustable fixed relation. The first end also includes an adjuster for adjusting the aligned relation of the mount/dismount head with respect to the first end of the connector such that the mount/dismount head is in proper alignment for use with the type of rim of a tire for which it was designed. The other end of the connector includes a locator for locating a fixed rotatable orientation about a vertical axis, and a sub-connector for preventing vertical displacement between the mount/dismount head and the connector. Thus, one end of the connector connects to a mount/dismount head to form a tool head. The other side of the connector attaches to the end of the swing arm in a properly aligned orientation. Therefore, the entire tool head can be quickly attached or detached from the end of the swing arm in a fixed rotatable orientation.

A second embodiment, which may be referred to as a quick change tool head, includes a mount/dismount head, an adapter stub, a locking nut, and a adapter stub locator. The mount/dismount head is designed to receive the adapter stub and be adjustably rotated relative to the adapter stub. The adapter stub has an upper portion adapted to mate with the end of the swing arm. The upper portion also includes a locator receptor for receiving a locator. A lower portion of the adapter stub is adapted to fit in and mate with and rotate freely in a mount/dismount head. The mount/dismount head is rotated relative to the adapter stub by screwing in or screwing out the adjusting screws such that the head will be proper alignment for use in changing a tire on a rim of a type for which the mount/dismount head was designed. A screw washer combination is used to connect the mount/dismount head with the adapter stub to form a tool head. The screw washer combination prevents vertical displacement of the mount/dismount head relative to the adapter stub while allowing rotational displacement between the adapter stub and mount/dismount head to ensure that the adapter stub is mated with the swing arm in the same fixed rotational orientation. The adapter stub locator used in one embodiment is a dowel which is sized and shaped to nestle in the upper portion of the adapter. The dowel is also sized to fit in a through bore of the end of the swing arm such that the adapter stub locator (the dowel) is secured within the swing arm. Thus, to mate the tool head with the swing arm in the fixed orientation one needs only mate the adapter stub to the end of the swing arm such that the adapter stub locator will nestle in the upper portion of the adapter, in what may be referred to as the adapter stub locator receptor.

BRIEF DESCRIPTION OF THE DRAWINGS

FIG. 5 is an embodiment of a typical quick change tool for a typical automotive tire rim.

FIG. 6 is an embodiment of a typical plastic quick change tool for decorative tire rims.

FIG. 7 is an embodiment of a typical quick change tool for an RTV or a motorcycle rim.

DESCRIPTION OF THE PREFERRED EMBODIMENT

Figure 1:
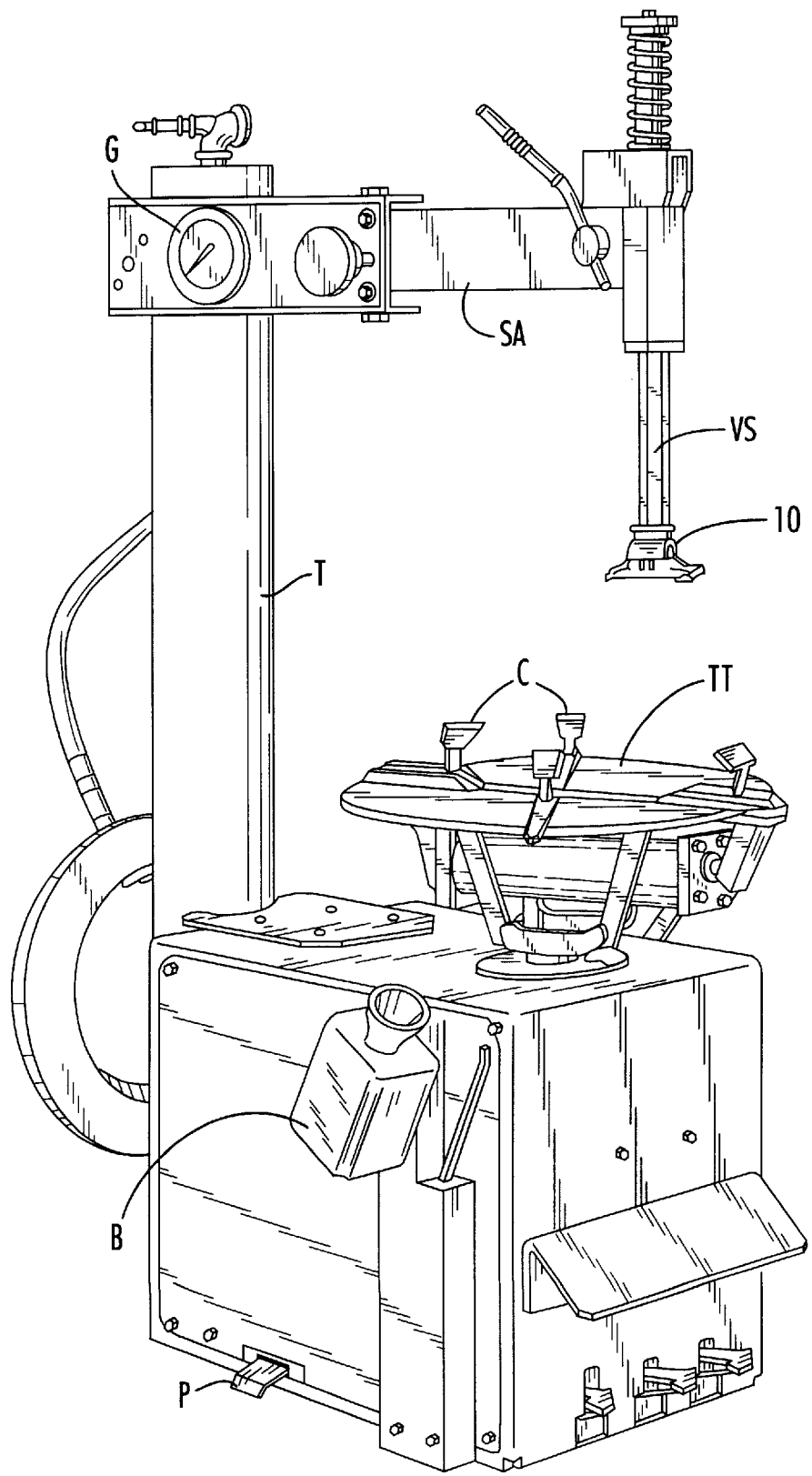
FIG. 1 is a perspective view of a prior art rim holding tire changer.

Applicant's invention will be best understood when considered in light of the following description of the preferred embodiment of the invention, as illustrated in the attached drawings wherein like reference numerals and characters refer to like parts.

Figure 2:
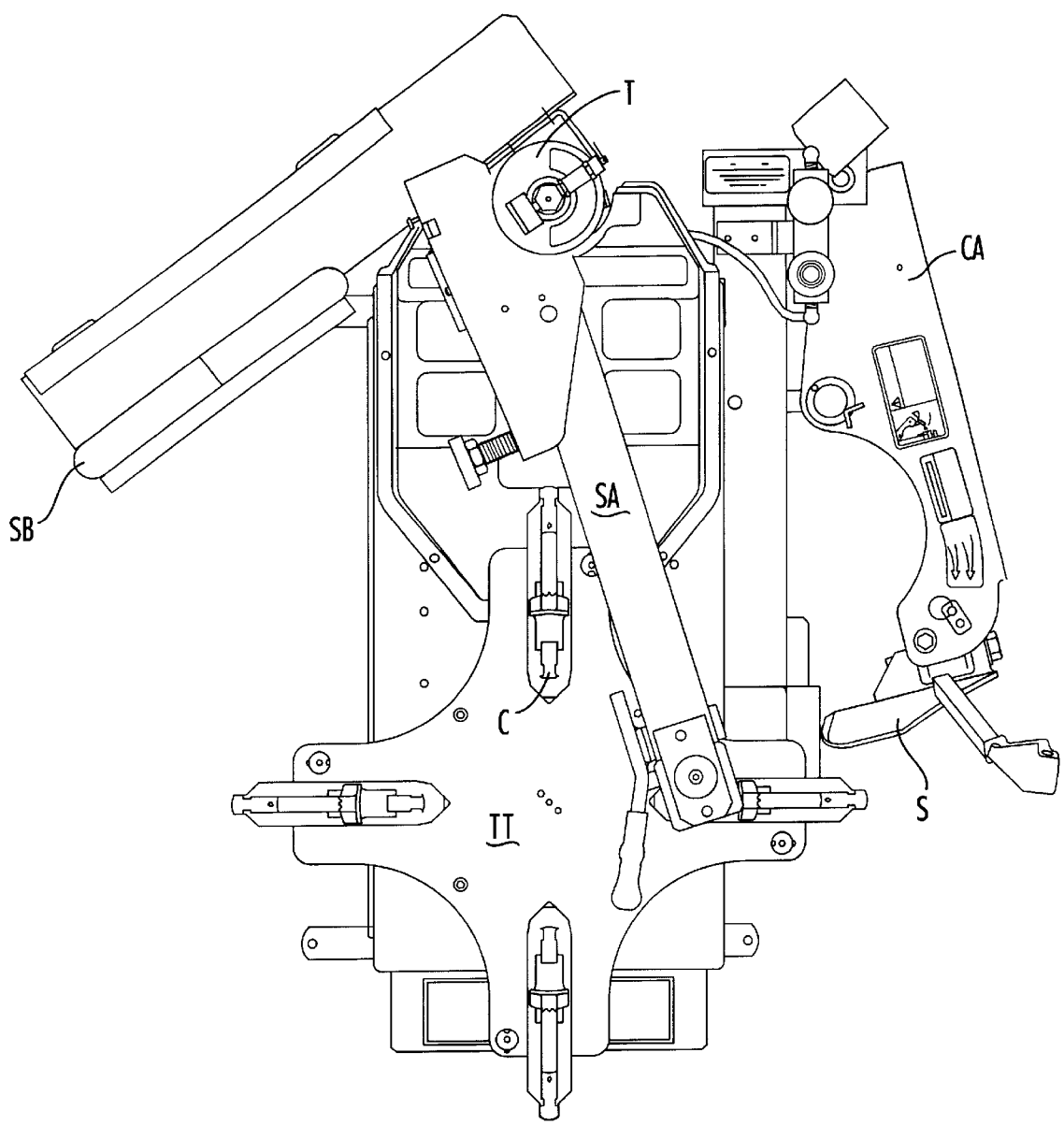
FIG. 2 is a top view of a prior art rim holding tire changer similar to the changer illustrated in FIG. 1 but including a safety barrier.
Figure 3:
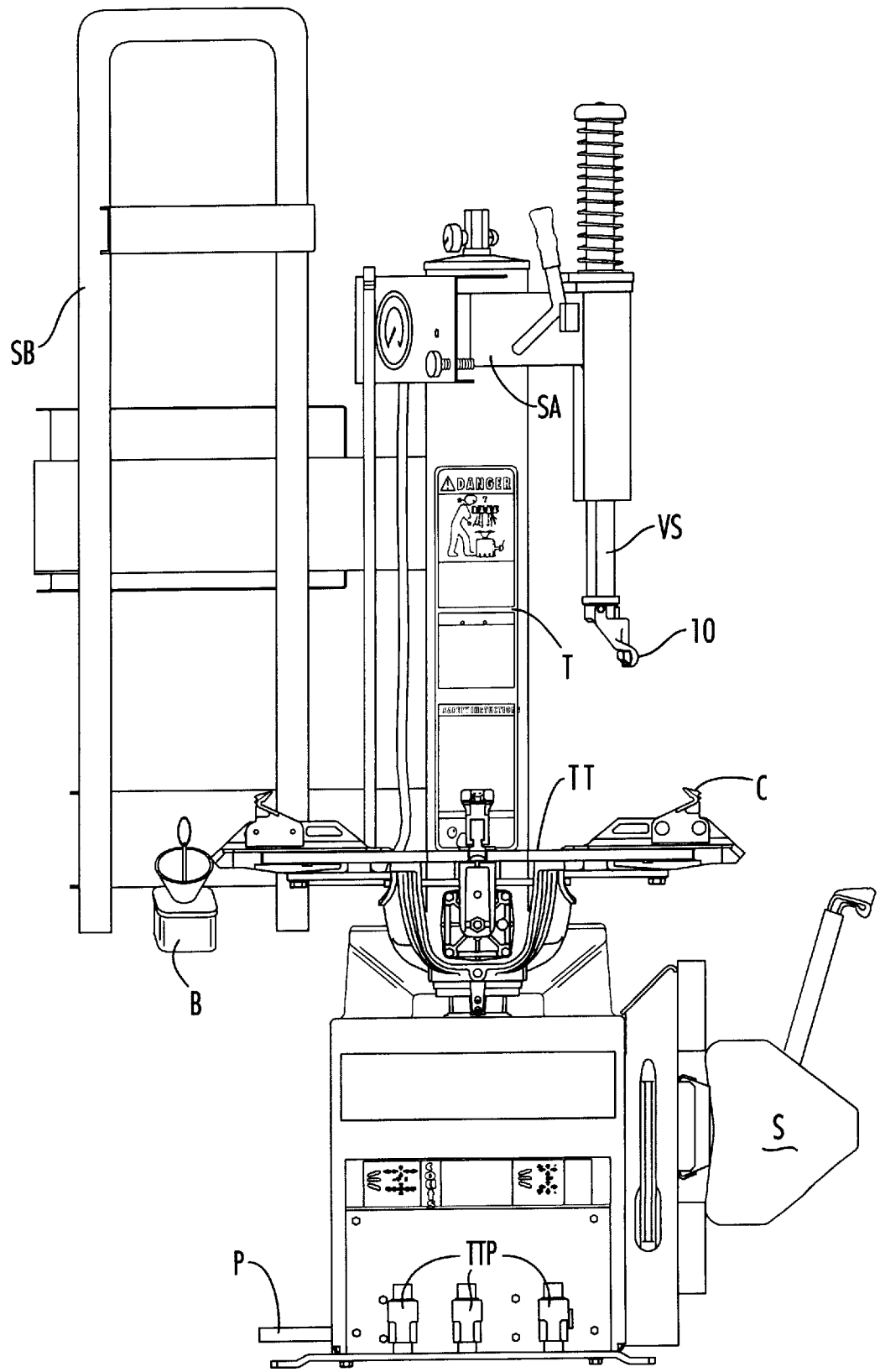
FIG. 3 is a front view of the rim holding tire changer shown in FIG. 2.

FIGS. 1 through 3 of the attached drawings show prior art rim holding tire changers. The prior art device in FIG. 3 is substantially the same as the device shown in FIGS. 1 and 2, except that FIGS. 1 and 2 do not include the safety barrier. Both devices include a tower (T), an air gage (G), an inflation peddle (P), a tabletop (TT), clamps (C), a lube bottle (B), a combination mount/dismount head (10), a swing arm (SA), a vertical slide shaft (VS) (also referred to as an end of the swing arm), table top peddles (TTP), a carrier arm (CA) for the bead loosener shoe (S).

In rim holding tire changers of the type shown in FIGS. 1, 2 and 3, a tire and rim will be placed on the table top (TT) and the rim is held in position by clamps (C). The swing arm (SA) is then rotated into place so that the combination mount/dismount head (10) can be engaged between the rim and tire and the table can then be caused to rotate to cause the combination mount/dismount head to pull the tire bead over the lip of the rim. Operation of the table and clamps are via the table top peddles (TTP) so the operator, in the course of mounting and dismounting of the tire on the rim is positioned at the front of the machine where the table top peddles are located. Since one rim holding tire changer can be used to mount or dismount the tires for a variety of vehicle types, a device which allows the mount/dismount head (10) to be quickly changed and aligned for use with the tire to be changed would be quite useful. The present invention is such a device; it allows a mount/dismount head to be quickly reattached to the end of a swing arm (SA) in a previously aligned position. Thus, the process of realigning the mount/dismount head to track a tangent line perpendicular to the rim center line is avoided.

Figure 4:
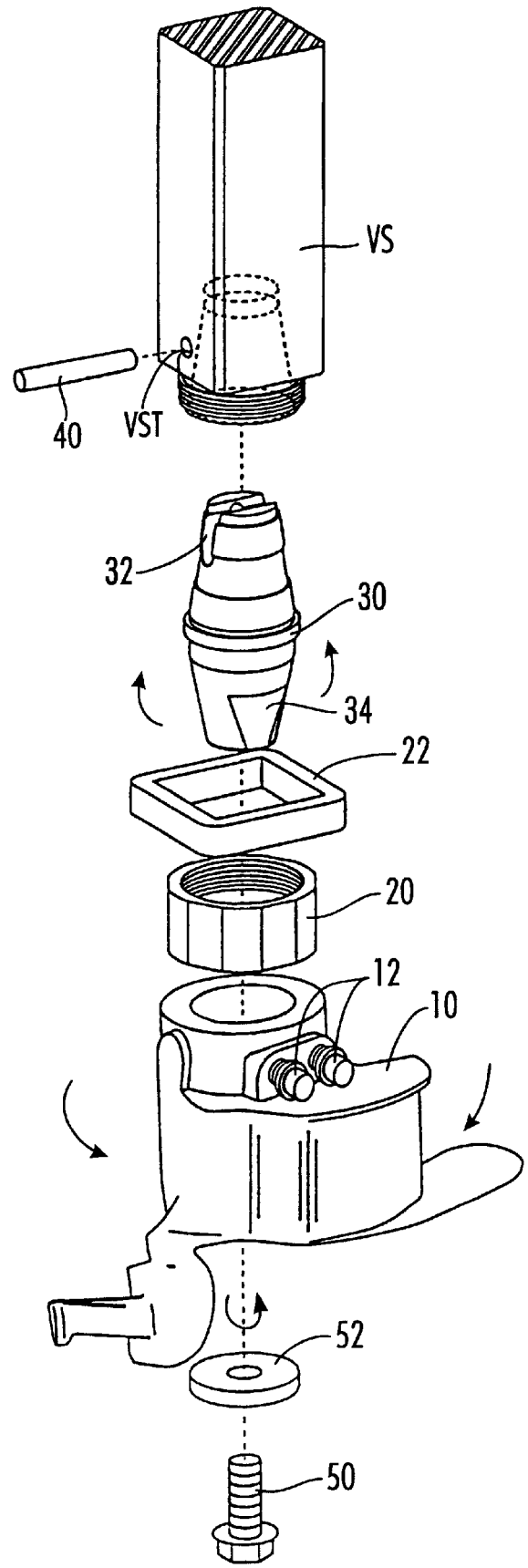
FIG. 4 is an exploded view of a quick change tool being attached to a vertical slide shaft; the shaft being attached to a swing arm of a rim holding tire changer, similar to the changers shown in FIGS. 1,2, and 3.

FIG. 4 is an exploded view of a preferred embodiment of this invention, a quick change tool. The quick change tool may include a mount/dismount head or simply be a connector for quickly connecting a mount/dismount head to a vertical shaft (VS). The preferred embodiment in FIG. 4 includes a mount/dismount head (10), adjusting screws (12) a locking nut (20), a rubber bumper (22), an adapter (30), an adapter stub locator (40), and a screw (50) and washer (52).

The mount/dismount head shown in FIG. 4 is a typical mount/dismount head for automobile rims. However, the invention will be used in conjunction with mount/dismount heads for other types of rims, or for special decorative rims.

If the vertical slide shaft has not been manufactured, adapted, or retrofitted to receive an adapter stub (30) in a fixed rotatable orientation, it will need to be. A simple retrofit is to bore a through-bore (VST) through the end of the vertical shaft. The diameter of the through-bore should be sized to securely hold the adapter stub locator (40) in place. As shown, the adapter stub locator is a roll pin or dowel. The dowel is sized to fit in the adapter stub locator receptor (32) of the adapter stub. As shown, the adapter stub locator receptor is a slot in the top of the adapter stub. The adapter stub is mated with the vertical shaft in a rotatable orientation. The aligned fixed rotatable orientation is achieved by aligning slot (32) to receive the dowel (40). Any adapter stub locator-adapter locator receptor combination which allows the adapter to be repeatedly mated with the vertical shaft in the fixed rotatable orientation is sufficient. A dowel-slot is only one combination. A square-square, pentagon-pentagon, bore-counter-bore, and the like, are all acceptable and only an indication of some possible combinations.

In the embodiment shown, the rubber bumper (22) is placed over the through bore of the vertical shaft to hold the roll pin in place.

The other end of the adapter stub (30) is mated with the mount/dismount head (10). One method of connecting the adapter stub to the mount/dismount head is through the use of a screw (50)-washer (52) combination. However, any method which allows the mount/dismount head to be fixed in an adjustable rotational relation to the adapter stub is sufficient. In the embodiment in FIG. 4, the mount/dismount head can rotate freely about the adapter stub. The adjustment screws (12) serve to adjust the mount/dismount head about the adapter stub and then fix the rotation relation.

The adapter stub (30) a substantially flat surface (34). In a preferred embodiment, a vector normal to said flat surface (34) is substantially orthogonal to an angular vector of rotation between said adapter stub and said mount/dismount head. The angular vector of rotation for the embodiment shown in FIG. 4 is along the long axis of the adapter stub (30). Also observable from FIG. 4, is that, generally, the adjusting screws (12) lie in a plane substantially orthogonal to the flat surface (34) of the adapter stub (30). The rotational relationship between the mount/dismount head (10) and the adapter stub (30) is adjusted by screwing said screws (12) in and out to create forces on said flat surface (34) to adjust the mount/dismount head relative to the adapter stub (30).

The screw-washer combination need only fix the vertical displacement of the mount/dismount head with respect to the adapter stub. Here, the screw screws into the adapter stub, securing the mount/dismount head to it with locking nut (20) disposed between the two. The mount/dismount head-locking nut-adapter stub, held in place by the screw, form what may be referred as a tool head. Initially, the rotational alignment of the mount/dismount head, and hence tool head, will have to be adjusted by screwing the adjustment screws in or out to align the mount/dismount head with a tangent line perpendicular to the rim of a tire for which that type of head was designed. Any adjustment device which accomplishes similar adjustment will be sufficient; the device need not be limited to adjustment screws. Once the vertical shaft has been adapted with an adapter locator and the tool head has been initially aligned, the proper tool head is selected and quickly attached in the proper alignment by mating the adapter stub to the vertical shaft and securing it in place with the locking nut. The tool head is attached in the same fixed rotatable orientation by matching up the adapter stub locator and the adapter stub locator receptor. Thus the tool head is quickly reattached in its previous rotational alignment and is orientated for use with the tire rim.

FIGS. 5 through 7 show tool heads for a variety of rims ready to be attached to an adapted/retrofitted vertical shaft.

Although there have been described particular embodiments of the present invention of a new and useful Rim Holding Tire Changers Mount/Dismount Head Connect Structure, it is not intended that such references be construed as limitations upon the scope of this invention except as set forth in the following claims.

What is claimed is:

1. A quick change tool head for use in conjunction with a rim holding tire changer, said tool head designed for easy detachment from, and re-attachment to, a swing arm of a rim holding tire changer in a fixed rotational orientation, said tool head comprising:

a mount/dismount head for assisting in the mounting of a tire on a tire rim and the dismounting of a tire from a tire rim;

an adapter connected to said mount/dismount head, said adapter including guide means for connecting said adapter in a fixed rotational orientation to a swing arm of a rim holding tire changer, said adapter further including adjustment means for adjusting said rotational relation between said adapter and said mount/dismount head to achieve an operable mount/dismount head alignment relative to a tire rim; and attachment means for easy detaching and re-attaching of said tool head from, and to, a swing arm of a rim holding tire changer, whereby after initially adjusting said mount/dismount head relative to said adapter, operable mount/dismount head alignment relative to a tire rim is achieved upon said re-attaching without further adjustment.

2. A quick change tool head for use in conjunction with a rim holding tire changer, said tool head designed for easy detachment from, and re-attachment to, an elongated bar mounted on a swing arm of a rim holding tire changer in a fixed rotational orientation, said tool head comprising:

a mount/dismount head for assisting in the mounting of a tire on a tire rim and the dismounting of a tire from a tire rim;

an adapter stub having opposing ends, a first of said opposing ends shaped to mate with and connect to said mount/dismount head in a rotational relation thereto;

an adjuster for adjusting and aligning said rotational relationship between said adapter stub first opposing end and said mount/dismount head such that said mount/dismount head can be adjusted to a proper rotational alignment for use with a tire rim;

a connector for preventing vertical displacement between said mount/dismount head and said adapter stub whereby said vertical displacement connector, said adapter stub and said mount/dismount head form said tool head;

a locator for locating said tool head in a fixed rotatable orientation relative to an elongated bar mounted on a swing arm of a rim holding tire changer, whereby proper alignment of said tool head for use with a tire rim is achieved; and an attachment device for easy detaching and re-attaching of said tool head from, and to, an elongated bar mounted on a swing arm of a rim holding tire changer, in said fixed rotatable orientation, said attachment device being attached to said tool head whereby after initially adjusting and aligning said mount/dismount head relative to said adapter stub first opposing end to achieve a proper alignment for use with a tire rim, an operator can quickly detach said tool head using said attachment device, and quickly re-attach said tool head in proper alignment for use with a tire rim, when needed, using said attachment device without having to re-align said tool head.

3. The quick change tool head as claimed in claim 2, wherein said attachment device includes a lock nut.

4. The quick change tool head as claimed in claim 2, wherein said first of said opposed ends is conical.

5. The quick change tool head as claimed in claim 4, wherein said mount/dismount head includes a conical hole for mating with said adapter stub first opposed end.

6. The quick change tool head as claimed in claim 5, wherein said first opposed end includes a substantially flat surface, wherein a vector normal to said flat surface is substantially orthogonal to an angular vector of said rotation between said adapter stub and said mount/dismount head.

7. The quick change tool head as claimed in claim 2, wherein said adjuster includes screws for adjusting said rotational relation of said mount/dismount head relative to said adapter stub first opposed end.

8. The quick change tool head as claimed in claim 6, wherein said adjuster includes screws for adjusting said rotation relation of said mount/dismount head relative to said adapter stub first opposed end.

9. The quick change tool head as claimed in claim 8, wherein said adjusting screws lie in a plane substantially orthogonal to said flat surface of said adapter stub first opposed end and said rotational relation of said mount/dismount head relative to said adapter stub first opposed end is adjusted by screwing said screws in and out to create forces on said flat surface to adjust said rotational relation of said mount/dismount head relative to said first opposing end.

10. The quick change tool head as claimed in claim 2, wherein said locator is disposed in an elongated bar mounted on a swing arm of a rim holding tire changer.

11. The quick change tool head as claimed in claim 10, wherein said adapter stub includes a second opposed end having a bore disposed therein; and said locator includes a counter-bore in registry with said adapter stub bore.

12. The quick change tool head as claimed in claim 9, wherein said locator is disposed in an elongated bar mounted on a swing arm of a rim holding tire changer.

13. The quick change tool head as claimed in claim 12, wherein said adapter stub includes a second opposed end having a channel disposed therein; and said locator includes a dowel shape, said dowel shape sized to nestle in said channel of said adapter stub second opposed end.

14. The quick change tool head as claimed in claim 2, wherein said vertical displacement connector includes a screw-washer combination.

15. The quick change tool head as claimed in claim 13, wherein said vertical displacement connector includes a screw-washer combination.

16. A quick change tool head improvement for connecting a mount/dismount head to an elongated bar mounted on a swing arm of a rim holding tire changer in a fixed rotational orientation, including a rim holding tire changer and a mount/dismount head for assisting in the mounting of a tire on a tire rim and the dismounting of a tire from a tire rim, the rim holding tire changer including a table on which a tire to be changed is positioned, clamps for holding a rim of a tire placed on the table and a swing arm mounted for swinging the mount/dismount head into and out of engagement with a tire on the table, and an elongated bar to which the mount/dismount head is to be connected; the swing arm having a free end, the elongated bar having an upper end and a free end, wherein the elongated bar upper end is mounted on the free end of the swing arm and the mount/dismount head is to be connected to the elongated bar free end, the improvement comprising:

an adapter stub having opposing ends, a first of said opposing ends shaped to mate with and connect to the mount/dismount head in a rotational relation thereto;

an adjuster for adjusting and aligning said rotational relationship between said adapter stub first opposing end and the mount/dismount head such that the mount/dismount head can be adjusted to a proper rotational alignment for use with a tire rim;

a connector for preventing vertical displacement between the mount/dismount head and said adapter stub whereby said vertical displacement connector, said adapter stub and the mount/dismount head form a tool head;

a locator for locating said tool head in a fixed rotatable orientation relative to the elongated bar mounted on the swing arm of the rim holding tire changer, whereby proper alignment of said tool head for use with a tire rim is achieved; and an attachment device for easy detaching and re-attaching of said tool head from, and to, the elongated bar free end, in said fixed rotatable orientation, said attachment device being attached to said tool head whereby after initially adjusting and aligning the mount/dismount head relative to said adapter stub first opposing end to achieve a proper alignment for use with a tire rim, an operator can quickly detach said tool head using said attachment device, and quickly re-attach said tool head in proper alignment for use with a tire rim, when needed, using said attachment device without having to re-align said tool head.

17. The quick change tool head improvement as claimed in claim 16, wherein said locator is disposed in the elongated bar mounted on the swing arm of the rim holding tire changer.

18. The quick change tool head improvement as claimed in claim 17, wherein said adapter stub includes a second opposed end having a channel disposed therein; and said locator includes a dowel sized to nestle in said channel.

19. The quick change tool head improvement as claimed in claim 17, wherein said locator includes a locator containment device for maintaining said locator in the elongated bar.

20. The quick change tool head improvement as claimed in claim 17, wherein said adapter stub includes a second opposed end having a predetermined shape; and said locator disposed in the elongated bar includes a conforming shape adapted to mate with said predetermined shape, whereby proper alignment of said tool head for use with a tire rim is achieved through mating said conforming shape to said predetermined shape.

\* \* \* \* \*